(12) United States Patent
Seki et al.

(10) Patent No.: US 8,074,089 B2
(45) Date of Patent: Dec. 6, 2011

(54) POWER SUPPLY CONTROLLING SYSTEM

(75) Inventors: Fujio Seki, Shinagawa (JP); Yuichiro Terasawa, Shinagawa (JP)

(73) Assignee: Fujitsu Component Limited, Tokyo (JP)

(*) Notice: Subject to any disclaimer, the term of this patent is extended or adjusted under 35 U.S.C. 154(b) by 554 days.

(21) Appl. No.: 12/289,981

(22) Filed: Nov. 7, 2008

(65) Prior Publication Data

US 2009/0125734 A1 May 14, 2009

(30) Foreign Application Priority Data

Nov. 8, 2007 (JP) .................. 2007-291361

(51) Int. Cl.
*G06F 1/00* (2006.01)
*H04L 5/00* (2006.01)

(52) U.S. Cl. ........ 713/310; 713/300; 713/400; 725/111; 725/120

(58) Field of Classification Search .................. 713/300, 713/310, 400; 725/111, 120
See application file for complete search history.

(56) References Cited

U.S. PATENT DOCUMENTS

| | | | | |
|---|---|---|---|---|
| 6,125,449 A * | 9/2000 | Taylor et al. | ................. | 713/310 |
| 6,624,797 B1 * | 9/2003 | Wheeler et al. | ................. | 345/1.2 |
| 2004/0049798 A1 * | 3/2004 | Ha | ................. | 725/133 |
| 2004/0189800 A1 * | 9/2004 | Berkey et al. | ................. | 348/143 |
| 2006/0117198 A1 * | 6/2006 | Takasu | ................. | 713/323 |
| 2006/0222022 A1 * | 10/2006 | Shintani et al. | ................. | 370/537 |
| 2006/0238501 A1 * | 10/2006 | Liou | ................. | 345/156 |
| 2008/0247341 A1 * | 10/2008 | Lee | ................. | 370/294 |

FOREIGN PATENT DOCUMENTS

| | | |
|---|---|---|
| EP | 0516058 A2 | 12/1992 |
| JP | 5-83689 | 4/1993 |
| JP | 7-203491 | 8/1995 |
| JP | 11-340974 | 12/1999 |

* cited by examiner

*Primary Examiner* — Vincent Tran
(74) *Attorney, Agent, or Firm* — Staas and Halsey LLP

(57) ABSTRACT

A power supply controlling system includes a receiving device, a power supply device, and a transmitting device connected to an information processing apparatus. The receiving device includes a transmitting portion that transmits a switch signal of a power supply switch used for on/off of the power supply device to the transmitting device via second signal lines used for the reception of a second video signal, which are different from first signal lines used for the reception of a first video signal. The transmitting device includes an acquiring portion that acquires the switch signal from the second signal lines on which the second video signal and the switch signal are mixed, and an outputting portion that outputs the switch signal to the power supply device. The receiving device and the transmitting device are connected with a single cable including the first and the second signal lines.

13 Claims, 9 Drawing Sheets

FIG. 3

| NUMBER OF SIGNAL LINE | NAME OF SIGNAL | REMARKS |
|---|---|---|
| 1 | R+ | USE TRANSMISSION OF ON/OFF SIGNAL OF POWER SUPPLY |
| 2 | R- | USE TRANSMISSION OF ON/OFF SIGNAL OF POWER SUPPLY |
| 3 | SA | |
| 4 | G+ | SUPERIMPOSITION OF HORIZONTAL SYNCHRONIZING SIGNAL |
| 5 | G- | SUPERIMPOSITION OF HORIZONTAL SYNCHRONIZING SIGNAL |
| 6 | SB | |
| 7 | B+ | SUPERIMPOSITION OF VERTICAL SYNCHRONIZING SIGNAL |
| 8 | B- | SUPERIMPOSITION OF VERTICAL SYNCHRONIZING SIGNAL |

PRIOR ART

POWER SUPPLY CONTROLLING SYSTEM

BACKGROUND OF THE INVENTION

1. Field of the Invention

The present invention relates to a power supply controlling system having a receiving device, and a transmitting device connected to an information processing apparatus outputting a video signal and a power supply device supplying electric power to the information processing apparatus.

2. Description of the Related Art

Conventionally, there has been known a technique that superimposes a signal for power supply control other than a video signal on the video signal, and transmits the superimposed signal to a remote place (see Japanese Laid-Open Patent Publication Nos. 07-203491, 05-83689, and 11-340974, for example).

In the technique, a controlling device is connected to a controlled device with a dedicated coaxial cable or a digital interface line.

Since in the technique of Japanese Laid-Open Patent Publication Nos. 07-203491, 05-83689, and 11-340974, the controlling device is connected to the controlled device with the dedicated coaxial cable or the digital interface line, the connection between the controlling device and the controlled device suffices with one cable. However, when the controlling device is connected to the controlled device with a cable to which standards have been decided, the connection between the controlling device and the controlled device may be insufficient in one cable.

For example, when in the a power supply controlling system of FIG. 9, a local device is connected to a remote device with a Cat 5 (category 5) cable having a length of hundreds of meters, i.e., a LAN cable, the local device outputs RGB signals received from a personal computer as differential signals, and hence six signal lines are occupied by the RGB signals among eight signal lines included in one LAN cable. A serial signal from a mouse, a keyboard, or a printer is output from the remote device to the local device as differential signals, so that two signal lines are occupied by the serial signal among the eight signal lines. Therefore, an unused signal line is lost in the eight signal lines.

In this state, to transmit an ON/OFF signal of electric power from the remote device to a remote power supply via the local device, it is necessary to connect a new LAN cable between the local device and remote device.

As a result, the number of LAN cables connected between the local device and remote device increases, so that wiring work of the LAN cables is complicated, and cost performance deteriorates.

SUMMARY OF THE INVENTION

It is an object of the present invention to provide a power supply controlling system that can simplify wiring work of a cable, and improve cost performance.

According to a first aspect of the present invention, there is provided a power supply controlling system including a receiving device, a power supply device that supplies electric power to an information processing apparatus outputting first and second video signals, and a transmitting device connected to the information processing apparatus, the receiving device including: a power supply switch; and a transmitting portion that transmits a switch signal of the power supply switch used for on/off of the power supply device to the transmitting device via second signal lines used for the reception of the second video signal, which are different from first signal lines used for the reception of the first video signal, the transmitting device including: an acquiring portion that acquires the switch signal of the power supply switch from the second signal lines on which the second video signal and the switch signal of the power supply switch are mixed; and an outputting portion that outputs the switch signal of the power supply switch to the power supply device, wherein the receiving device and the transmitting device are connected to each other with a single cable including the first signal lines and the second signal lines.

With the above configuration, it is possible to control ON/OFF of the power supply device provided on a remote place via the single cable. Further, wiring work of the cable can be simplified and cost performance can be improved.

Preferably, each of the first video signal and the second video signal includes at least one blank period for transmitting a video synchronizing signal from the transmitting device to the receiving device, and the transmitting portion transmits the switch signal of the power supply switch to the transmitting device via the second signal lines in synchronization with the video synchronizing signal superimposed on the first video signal.

With the above configuration, since the switch signal is transmitted by using the blank period of the second video signal, the switch signal does not collide with the second video signal, and can be certainly transmitted to the transmitting device. Further, the second video signal and the switch signal can be mutually transmitted in More preferably, the acquiring portion acquires the switch signal of the power supply switch from the second signal lines in timing synchronous with the video synchronizing signal.

With the above configuration, the acquiring portion can certainly acquire the switch signal from the second video signal and the switch signal which are mixed in the second signal lines.

Preferably, the power supply device supplies the electric power to the information processing apparatus or cancels supplying the electric power to the information processing apparatus, according to the switch signal from the transmitting device.

With the above configuration, the receiving device can control the supply of the electric power or the cancel of the supply of the electric power from the power supply device to the information processing apparatus via the single cable and the transmitting device.

Preferably, the transmitting device includes a converting portion that the switch signal into a pattern signal composed of digital patterns, and the acquiring portion acquires the pattern signal from the second signal lines on which the second video signal and the pattern signal are mixed.

With the above configuration, the acquiring portion can more certainly acquire the pattern signal from the second video signal and the pattern signal which are mixed, and the power supply controlling system can be more prevented from malfunctioning.

BRIEF DESCRIPTION OF THE DRAWINGS

Preferred embodiments of the present invention will be described in detail with reference to the following drawings, wherein:

FIG. 3 is a diagram showing the specifications of a LAN cable 5;

DESCRIPTION OF THE PREFERRED EMBODIMENTS

A description will now be given, with reference to the accompanying drawings, of an embodiment of the present invention.

Figure 1:
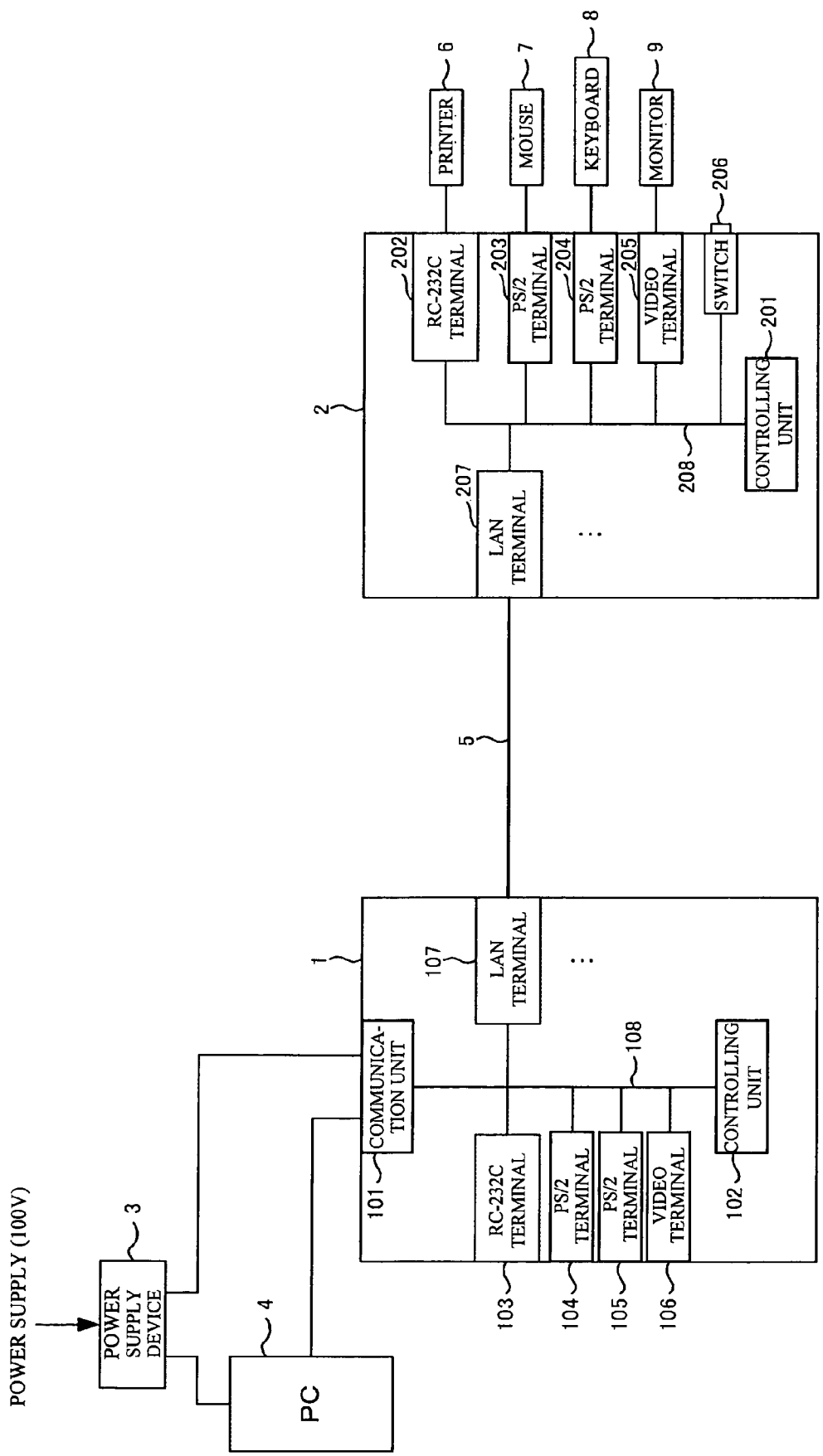
FIG. 1 is a schematic diagram showing the configuration of a power supply controlling system according to an embodiment of the present invention.

FIG. 1 is a schematic diagram showing the configuration of a power supply controlling system according to an embodiment of the present invention.

As shown in FIG. 1, the power supply controlling system includes a transmitting device 1, a receiving device 2, a power supply device 3, a computer (hereinafter referred to as a "PC") 4, a LAN cable 5 as a network cable, a printer 6, a mouse 7, a keyboard 8, and a monitor 9.

The transmitting device 1 includes: a communication unit 101 that transmits a signal indicative of ON/OFF of electric power to the power supply device 3, and receives RGB signals from the PC 4; a controlling unit 102 that controls the entire transmitting device 1; an RS-232C terminal 103 that is connectable to a printer, not shown; a PS/2 terminal 104 that is connectable to a mouse, not shown; a PS/2 terminal 105 that is connectable to a keyboard, not shown; a video terminal 106 that is connectable to a monitor, not shown; and a LAN terminal 107 that is connected to the LAN cable 5. The controlling unit 102 is connected to the communication unit 101, the RS-232C terminal 103, the PS/2 terminals 104 and 105, the video terminal 106, and the LAN terminal 107 via a system bus 108. The transmitting device 1 may has a plurality of LAN terminals.

The receiving device 2 includes: a controlling unit 201 that controls the entire receiving device 2; an RS-232C terminal 202 that is connected to a printer 6; a PS/2 terminal 203 that is connected to a mouse 7; a PS/2 terminal 204 that is connected to a keyboard 8; a video terminal 205 that is connected to a monitor 9; a switch 206 that outputs a signal indicative of ON/OFF of electric power supplied from the power supply device 3 to the PC 4 (hereinafter referred to as a "switch signal"); and a LAN terminal 207 that is connected to the LAN cable 5. The controlling unit 201 is connected to the RS-232C terminal 202, the PS/2 terminals 203 and 204, the video terminal 205, the switch 206, and the LAN terminal 207 via a system bus 208. The receiving device 2 may has a plurality of LAN terminals.

Figure 2:
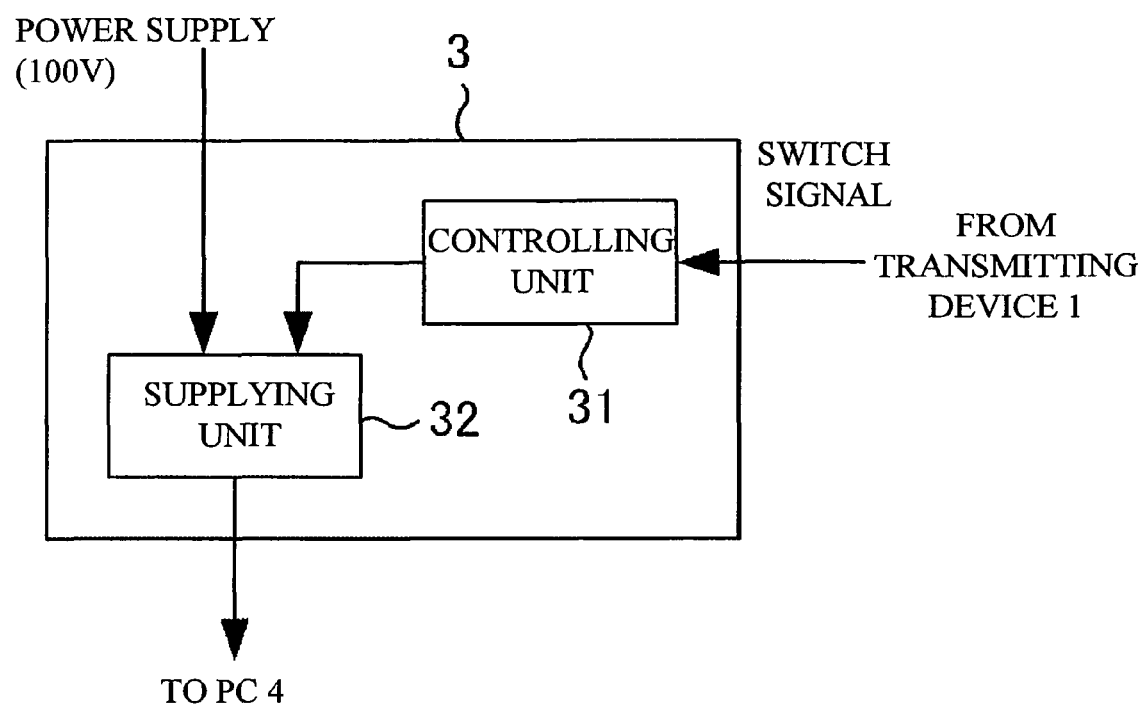
FIG. 2 is a schematic diagram showing the configuration of a power supply device 3.

The power supply device 3 supplies the electric power of 100 volts to the PC 4, or cancels supplying the electric power of 100 volts to the PC 4, based on the switch signal transmitted from the switch 206 of the receiving device 2 via the transmitting device 1. FIG. 2 shows the schematic configuration of the power supply device 3. The power supply device 3 includes a controlling unit 31 and a supplying unit 32. When the controlling unit 31 receives the switch signal of "ON" from the transmitting device 1, the supplying unit 32 supplies the electric power of 100 volts to the PC 4. When the controlling unit 31 receives the switch signal of "OFF" from the transmitting device 1, the supplying unit 32 cancels supplying the electric power of 100 volts to the PC 4. That is, the switch 206 of the receiving device 2 can control the supply of the electric power or the cancel of the supply of the electric power from the power supply device 3 to the PC 4 via the LAN cable 5 and the transmitting device 1.

When the PC 4 receives the supply of the electric power from the power supply device 3, the PC 4 transmits the RGB signals (including a red signal, a green signal, and a blue signal), the vertical synchronizing signal (Vsync), and the horizontal synchronizing signal (Hsync) to the transmitting device 1. The transmitting device 1 superimposes the horizontal synchronizing signal on the green signal, superimposes the vertical synchronizing signal on the blue signal, and transmits the two superimposed signals and the red signal to the receiving device 2 via the LAN cable 5.

The receiving device 2 receives the two superimposed signals and the red signal from the transmitting device 1 via the LAN cable 5, separates the two superimposed signals into the green signal, the blue signal, the horizontal synchronizing signal, and the vertical synchronizing signal, and outputs the RGB signals to the monitor 9 with the vertical synchronizing signal and the horizontal synchronizing signal.

A mouse signal from the mouse 7 and a key signal from the keyboard 8 are transmitted to the PC 4 via the LAN cable 5 and the transmitting device 1. When the printer 6 prints data, an instruction signal for print from the mouse 7 or the keyboard 8 is transmitted to the PC 4 via the LAN cable 5 and the transmitting device 1. Then, a print command and the data are transmitted from the PC 4 to the printer 6 via the LAN cable 5 and the transmitting device 1, and the printer 6 prints the data.

FIG. 3 is a diagram showing the specifications of the LAN cable 5.

The LAN cable 5 is composed of a Cat 5 (category 5) cable, for example, and includes eight signal lines. On the signal lines of numbers 1 and 2, the red signal (R+ and R− in FIG. 3) as the differential signals flows from the transmitting device 1 to the receiving device 2. The receiving device 2 transmits the switch signal to the transmitting device 1 for blank periods when the red signal does not flow.

On the signal lines of numbers 4 and 5, the green signal (G+ and G− in FIG. 3) as the differential signals flows from the transmitting device 1 to the receiving device 2. On the signal lines of numbers 7 and 8, the blue signal (B+ and B− in FIG. 3) as the differential signals flows from the transmitting device 1 to the receiving device 2. In the transmitting device 1, the horizontal synchronizing signal is superimposed on the green signal, and the vertical synchronizing signal is superimposed on the blue signal. In the receiving device 2, these superimposed signals are returned to the signals before the superimposition, i.e., are separated into the green signal, the blue signal, the horizontal synchronizing signal, and the vertical synchronizing signal.

On the signal lines of numbers 3 and 6, a serial signal (SA and SB in FIG. 3) as the differential signals flows. The serial signal has a signal including the print command to the printer 6, the mouse signal from the mouse 7, or the key signal from the keyboard 8.

Figure 4:
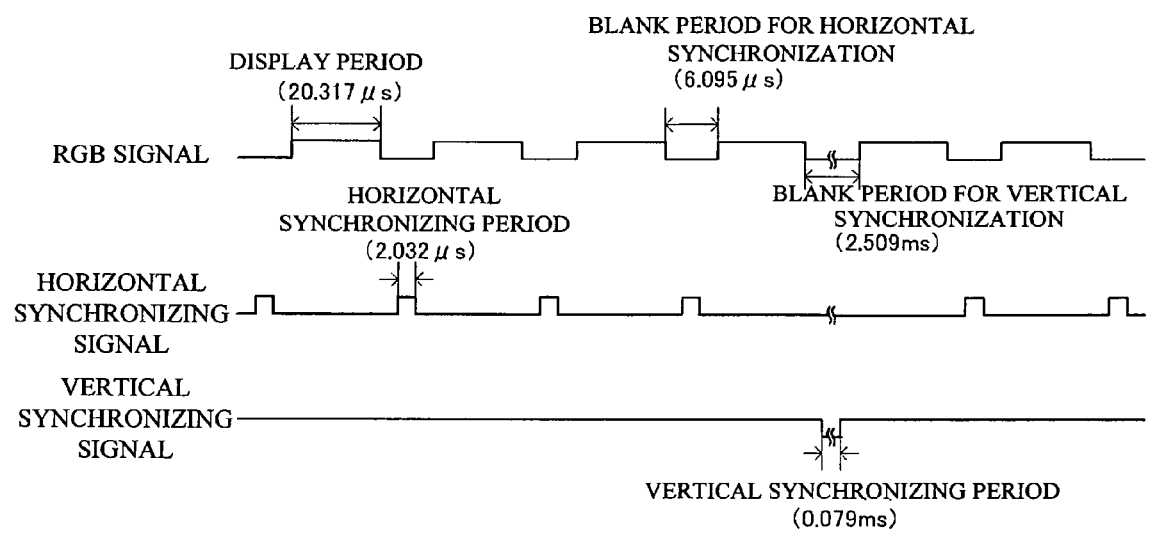
FIG. 4 is a timing chart of RGB signals, a horizontal synchronizing signal, and a vertical synchronizing signal.

FIG. 4 is a timing chart of the RGB signals, the horizontal synchronizing signal, and the vertical synchronizing signal. It should be noted that the timing chart corresponds to the standard of Monitor Timing Specifications 640*350@85 Hz of Video Electronics Standards Association (VESA).

As shown in FIG. 4, the RGB signals include blank periods for horizontal synchronization (6.095 μs), blank periods for vertical synchronization (2.509 ms), and display periods (20.317 μs). The horizontal synchronizing signal includes horizontal synchronizing periods (2.032 μs) at the cycles corresponding to the blank periods for horizontal synchronization, and the vertical synchronizing signal includes vertical synchronizing periods (0.079 ms) at the cycles corresponding to the blank periods for vertical synchronization.

In this timing chart, the vertical synchronizing signal is output once when the horizontal synchronizing signal is output 640 times, and this output processing is repeated 350 times, so that the display of one screen is formed.

Figure 5:
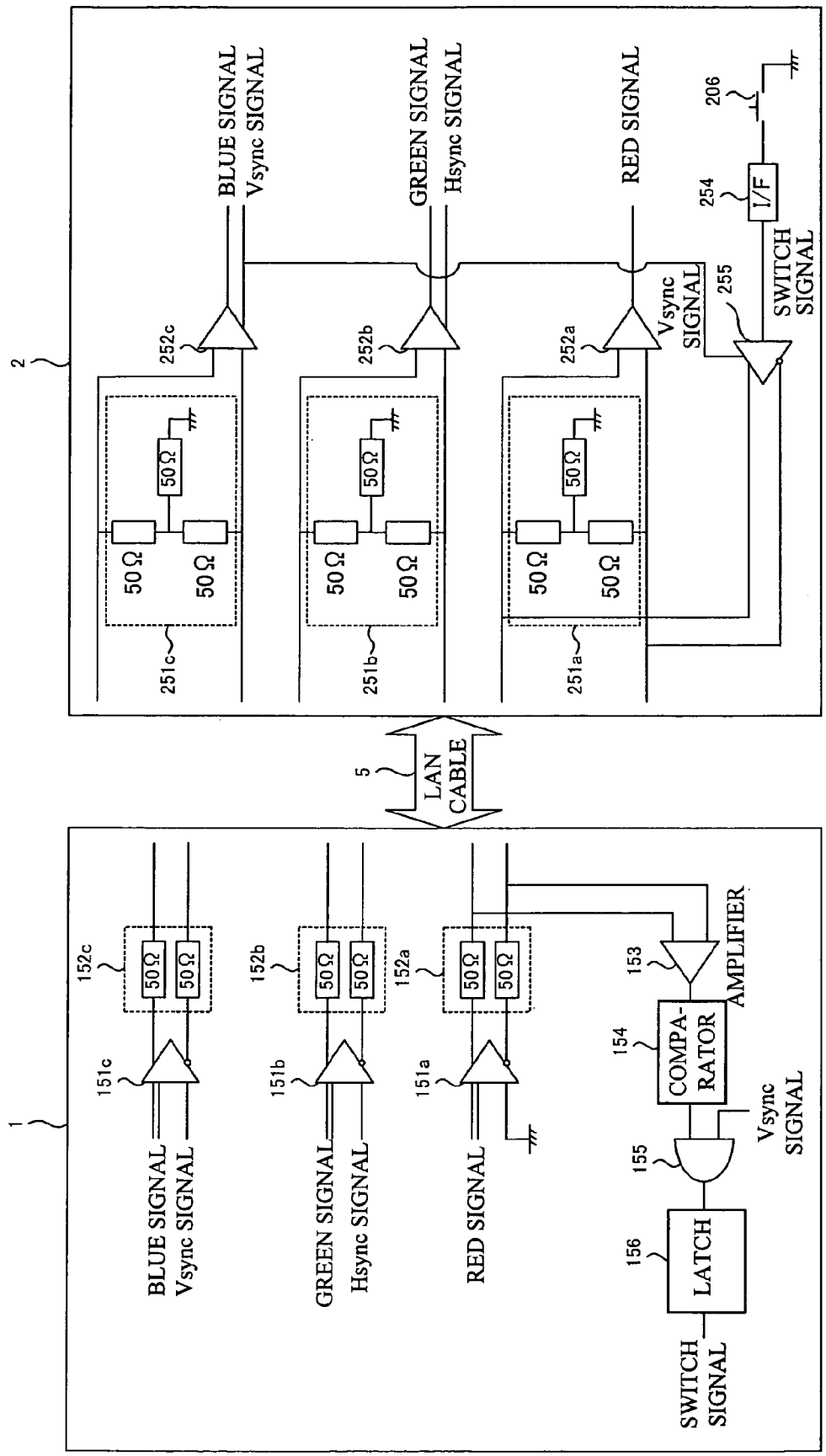
FIG. 5 is a schematic diagram showing circuits of a transmitting device 1 and a receiving device 2.

FIG. 5 is a schematic diagram showing circuits of the transmitting device 1 and the receiving device 2.

The transmitting device 1 includes superimposition circuits 151a to 151c, terminators 152a to 152c, an amplifier 153, a comparator 154, a synchronous circuit 155 (an acquiring portion), and a latch 156 (an outputting portion). The receiving device 2 includes terminators 251a to 251c, separation circuits 252a to 252c, the switch 206, an interface (I/F) circuit 254, and a transmitter 255 (a transmitting portion).

One end of the superimposition circuit 151a is grounded, and the superimposition circuit 151a inputs the red signal as the differential signals. Here, the red signal is directly output. The superimposition circuit 151b inputs the green signal as the differential signals, and the horizontal synchronizing signal, superimposes the horizontal synchronizing signal on the green signal, and outputs the superimposed signal. The superimposition circuit 151c inputs the blue signal as the differential signals, and the vertical synchronizing signal, superimposes the vertical synchronizing signal on the blue signal, and outputs the superimposed signal.

The terminators 152a to 152c prevent the signals output from the respective superimposition circuits 151a to 151c from being reflected, and prevent the signals from being disordered. The terminators 251a to 251c prevent the signals output from the transmitting device 1 from being reflected, and prevent the signals from being disordered.

The separation circuits 252a to 252c return the superimposed signals to the signals before the superimposition.

Although the separation circuit 252a inputs the red signal from the transmitting device 1, the horizontal synchronizing signal and the vertical synchronizing signal are superimposed on the red signal, and the separation circuit 252a therefore directly outputs the red signal. The separation circuit 252b inputs the green signal on which the horizontal synchronizing signal is superimposed, separates the superimposed signal into the horizontal synchronizing signal and the green signal, and output them. The separation circuit 252c inputs the blue signal on which the vertical synchronizing signal is superimposed, separates the superimposed signal into the vertical synchronizing signal and the blue signal, and output them. The output vertical synchronizing signal is input to the transmitter 255.

The I/F circuit 254 removes a noise which is called chattering generated when the switch 206 is turned on, and outputs the switch signal to the transmitter 255.

The transmitter 255 transmits the switch signal to the transmitting device 1 via the signal lines used for transmission of the red signal (i.e., the signal lines of numbers 1 and 2) in synchronization with the timing of the vertical synchronizing signal. As shown in the timing chart of FIG. 4, the vertical synchronizing signal is transmitted for the blank periods for vertical synchronization of the RGB signals (here, the red signal). Accordingly, even if the switch signal is transmitted to the transmitting device 1 in synchronization with the timing of the vertical synchronizing signal, the switch signal does not collide with the red signal on the signal lines of numbers 1 and 2 in the LAN cable 5. That is, on the signal lines of numbers 1 and 2, the red signal is transmitted from the transmitting device 1 to the receiving device 2 for a display period of the red signal, and the switch signal is transmitted from the receiving device 2 to the transmitting device 1 for the blank periods for vertical synchronization.

In the side of the transmitting device 1, the terminator 152a terminates the input of the red signal and the switch signal with a resistance of 50Ω, and hence the amplifier 153 detects a voltage corresponding to the red signal and the switch signal mixed on the signal lines. The amplifier 153 inputs the mixed red signal and the mixed switch signal, amplifies these signals, and outputs the amplified signals to the comparator 154. The comparator 154 digitalizes the amplified red signal and the amplified switch signal, and outputs the digitalized red signal and the digitalized switch signal to the synchronous circuit 155. The synchronous circuit 155 extracts the switch signal from the digitalized red signal and the digitalized switch signal in synchronization with the timing of the vertical synchronizing signal, and outputs the switch signal to the latch 156. The latch 156 holds the switch signal, and outputs the switch signal to the power supply device 3 at given timing.

As described in detail above, according to the power supply controlling system, the receiving device 2 includes the switch 206, and the transmitter 255 that transmits the switch signal used for ON/OFF of the power supply device 3 in synchronization with the vertical synchronizing signal superimposed on the blue signal to the transmitting device 1 via the signal lines of numbers 1 and 2 used for the reception of the red signal which are different from the signal lines of numbers 7 and 8 used for the reception of the blue signal. The transmitting device 1 includes the synchronous circuit 155 that acquires the switch signal from the signal lines of numbers 1 and 2 on which the red signal and the switch signal are mixed, based on the vertical synchronizing signal, and the latch 156 that outputs the switch signal to the power supply device 3. The receiving device 2 and the transmitting device 1 are connected to each other with the single LAN cable 5 including the signal lines of numbers 1, 2, 7, and 8.

Therefore, it is possible to control ON/OFF of the power supply device provided on the remote place via the single LAN cable. Further, two LAN cables needed conventionally are enough in one of them, so that wiring work of the cable can be simplified and cost performance can be improved.

Figure 6:
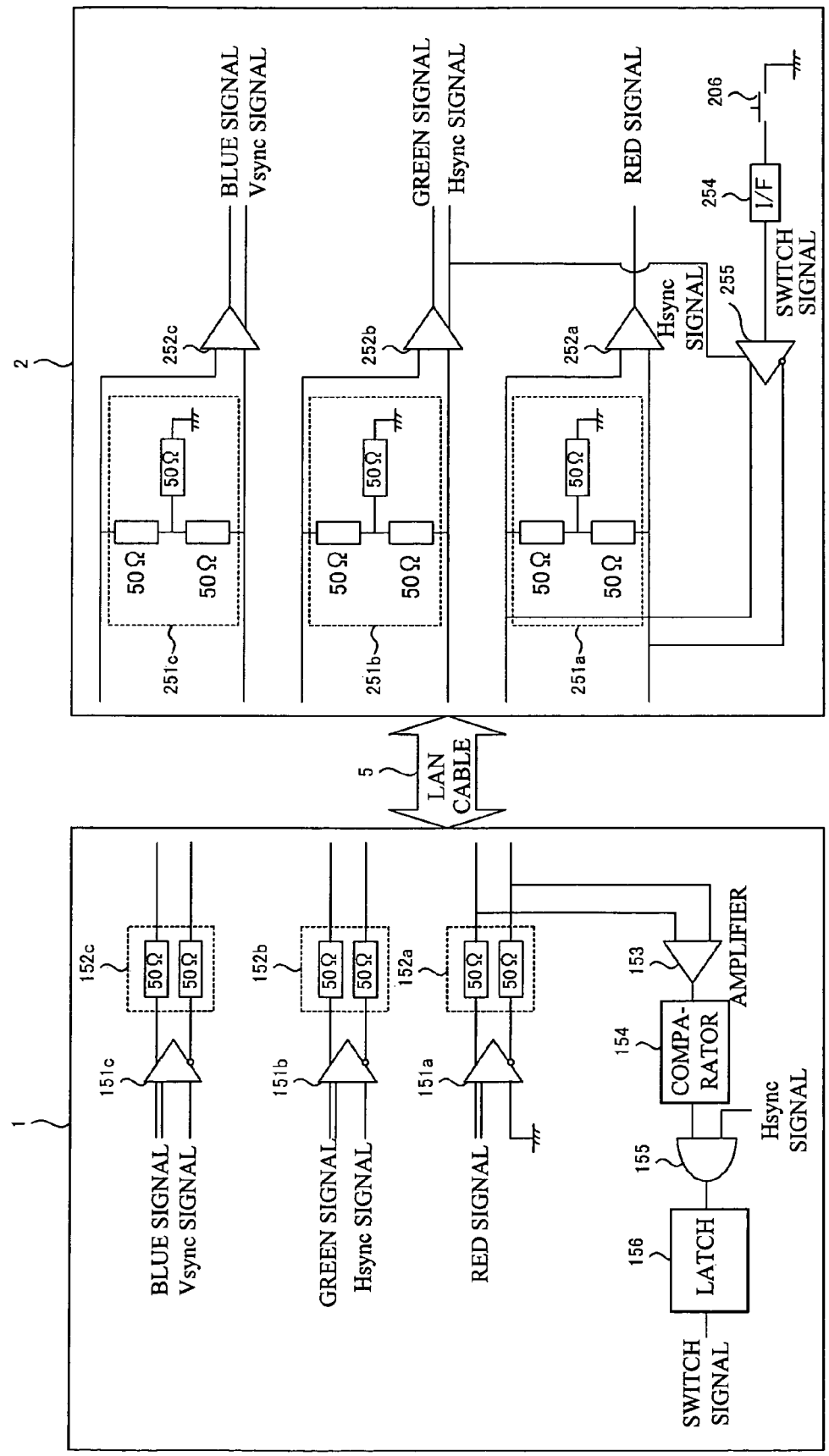
FIG. 6 is a schematic diagram showing a first variation of the circuits of the transmitting device 1 and the receiving device 2.

FIG. 6 is a schematic diagram showing a first variation of the circuits of the transmitting device 1 and the receiving device 2.

FIG. 6 is different from FIG. 5 in that the synchronizing signal input to the transmitter 255 is the horizontal synchronizing signal superimposed on the green signal, and the synchronizing signal input to the synchronous circuit 155 is the horizontal synchronizing signal. Other elements in FIG. 6 are the same as those in FIG. 5. In FIG. 6, on the signal lines of numbers 1 and 2 in the LAN cable 5, the red signal is transmitted from the transmitting device 1 to the receiving device 2 for the display period of the red signal, and the switch signal is transmitted from the receiving device 2 to the transmitting device 1 for the blank periods for vertical synchronization.

According to the power supply controlling system in FIG. 6, the receiving device 2 includes the switch 206, and the transmitter 255 that transmits the switch signal used for ON/OFF of the power supply device 3 in synchronization with the horizontal synchronizing signal superimposed on the green signal to the transmitting device 1 via the signal lines of numbers 1 and 2 used for the reception of the red signal which are different from the signal lines of numbers 4 and 5 used for the reception of the green signal. The transmitting device 1 includes the synchronous circuit 155 that acquires the switch signal from the signal lines of numbers 1 and 2 on which the red signal and the switch signal are mixed, based on the horizontal synchronizing signal, and the latch 156 that outputs the switch signal to the power supply device 3. The receiving device 2 and the transmitting device 1 are connected to each other with the single LAN cable 5 including the signal lines of numbers 1, 2, 4, and 5.

Therefore, it is possible to control ON/OFF of the power supply device provided on the remote place via the single LAN cable. Further, two LAN cables needed conventionally are enough in one of them, so that wiring work of the cable can be simplified and cost performance can be improved.

Figure 7:
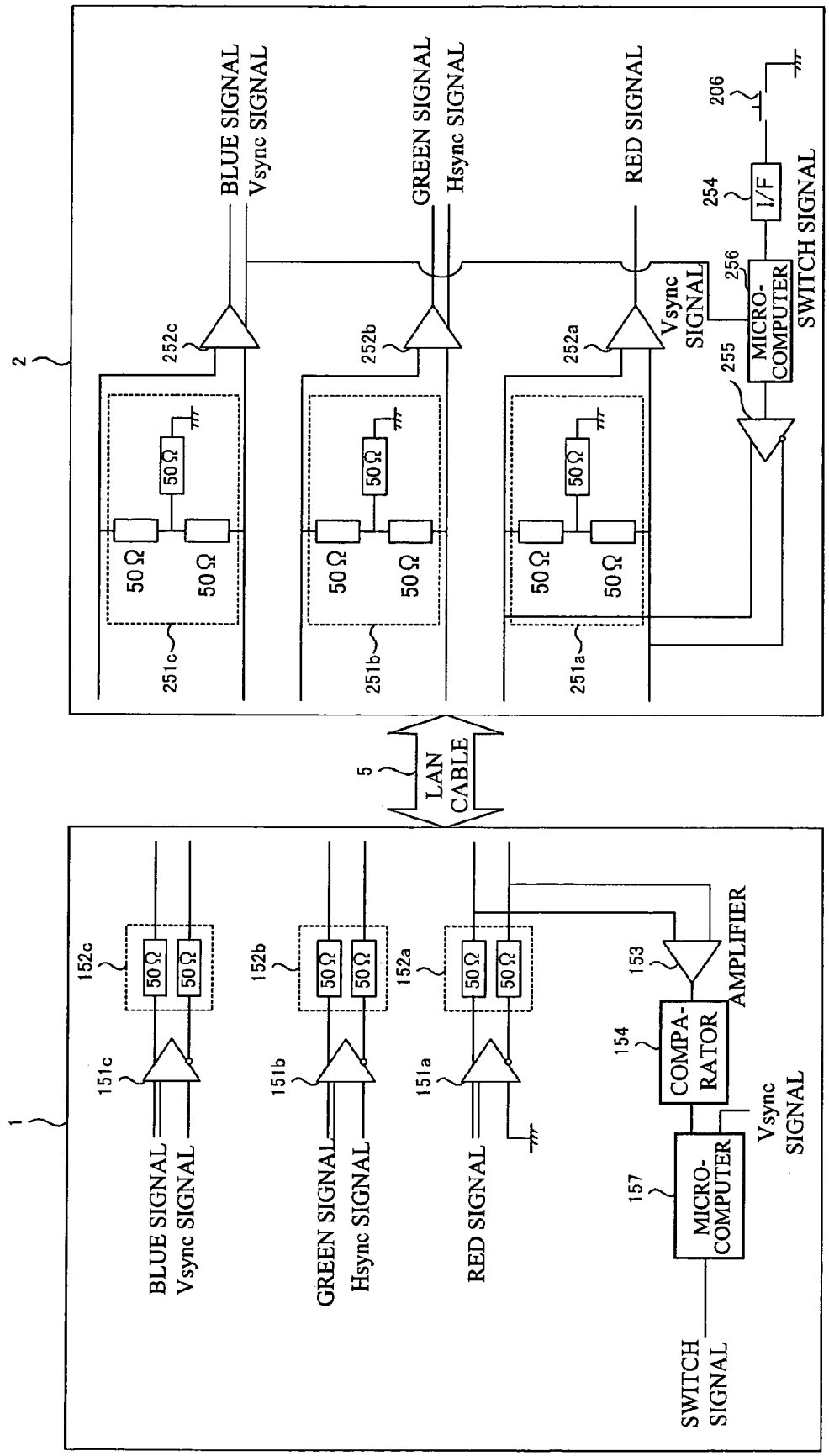
FIG. 7 is a schematic diagram showing a second variation of the circuits of the transmitting device 1 and the receiving device 2.

FIG. 7 is a schematic diagram showing a second variation of the circuits of the transmitting device 1 and the receiving device 2.

FIG. 7 is different from FIG. 5 in that the receiving device 2 includes a microcomputer 256 (a converting portion) provided between the I/F circuit 254 and the transmitter 255, and the transmitting device 1 includes a microcomputer 157 (an acquiring portion, and an outputting portion) on behalf of the synchronous circuit 155 and the latch 156. Other elements in FIG. 7 are the same as those in FIG. 5.

In FIG. 7, when the switch signal is output from the I/F circuit 254, the microcomputer 256 inputs the switch signal and outputs a pattern signal generated with the microcomputer 256 itself to the transmitter 255 in synchronization with the timing of the vertical synchronizing signal. The pattern signal represents a signal in which the switch signal indicative of ON/OFF of the power supply is complicated, and digital patterns of "0" and "1" are combined with complexity. For example, the pattern signal is "0101101011100110" of 16 digits. Accordingly, the microcomputer 157 can extract the pattern signal from the mixed red signal and the mixed pattern signal more certainly, and the system can be more prevented from malfunctioning.

The transmitter 255 transmits the pattern signal from the microcomputer 256 to the transmitting device 1. The amplifier 153 inputs the mixed red signal and the mixed switch signal, amplifies these signals, and outputs the amplified signals to the comparator 154. The comparator 154 digitalizes the amplified red signal and the amplified switch signal, and outputs the digitalized red signal and the digitalized switch signal to the microcomputer 157. The microcomputer 157 has functions of the synchronous circuit 155 and the latch 156, extracts the switch signal from the digitalized red signal and the digitalized switch signal in synchronization with the timing of the vertical synchronizing signal, and outputs the switch signal to the power supply device 3 at given timing.

According to the power supply controlling system in FIG. 7, the receiving device 2 includes the switch 206, and the microcomputer 256 and the transmitter 255 that transmit the pattern signal used for ON/OFF of the power supply device 3 in synchronization with the vertical synchronizing signal superimposed on the blue signal to the transmitting device 1 via the signal lines of numbers 1 and 2 used for the reception of the red signal which are different from the signal lines of numbers 7 and 8 used for the reception of the blue signal. The transmitting device 1 includes the microcomputer 157 that acquires the pattern signal from the signal lines of numbers 1 and 2 on which the red signal and the switch signal are mixed, based on the vertical synchronizing signal, and outputs the pattern signal to the power supply device 3. The receiving device 2 and the transmitting device 1 are connected to each other with the single LAN cable 5 including the signal lines of numbers 1, 2, 7, and 8.

Therefore, it is possible to control ON/OFF of the power supply device provided on the remote place via the single LAN cable. Further, two LAN cables needed conventionally are enough in one of them, so that wiring work of the cable can be simplified and cost performance can be improved.

According to the power supply controlling systems in FIGS. 5 to 7, the switch signal or the pattern signal is transmitted to the transmitting device 1 for the blank periods for horizontal synchronization or vertical synchronization of the red signal in synchronization with the horizontal synchronizing signal or the vertical synchronizing signal. Therefore, the switch signal or the pattern signal does not collide with the red signal, and can be certainly transmitted to the transmitting device 1. Further, the red signal and the switch signal or the pattern signal can be mutually transmitted in opposite directions via the signal lines of numbers 1 and 2.

Moreover, the synchronous circuit 155 or the microcomputer 157 of the transmitting device 1 acquires the switch signal or the pattern signal from the signal lines of numbers 1 and 2 in timing synchronous with the horizontal synchronizing signal or the vertical synchronizing signal. Therefore, the synchronous circuit 155 or the microcomputer 157 can certainly acquire the switch signal or the pattern signal from the mixed switch signal or the mixed pattern signal and the mixed red signal in the signal lines of numbers 1 and 2.

Although in the present embodiment, the horizontal synchronizing signal is superimposed on the green signal and the vertical synchronizing signal is superimposed on the blue signal, the superimposition destinations of the horizontal synchronizing signal and the vertical synchronizing signal may be any of the red signal, the green signal, and the blue signal. However, neither the horizontal synchronizing signal nor the vertical synchronizing signal are superimposed on one signal at the same time.

Although in the present embodiment, the horizontal synchronizing signal is superimposed on the green signal and the vertical synchronizing signal is superimposed on the blue signal, the description of the above-mentioned embodiment is adaptable to a composite-type synchronizing signal in which the horizontal synchronizing signal and the vertical synchronizing signal are synthesized to each other. When the composite-type synchronizing signal is used, the receiving device 2 transmits the switch signal or the pattern signal to the power supply device 3 via the transmitting device 1 for blank periods for synchronizing signal in any of the RGB signals in synchronization with the timing of the composite-type synchronizing signal.

Accordingly, the same effects as those obtained by the above-mentioned embodiment can be obtained. Further, when the composite-type synchronizing signal is superimposed on any one of the RGB signals, the blank periods for synchronizing signal corresponding to the two remaining signals of the RGB signals are not used. Therefore, by using the unused blank periods for synchronizing signal, a signal other than the switch signal or the pattern signal can be transmitted from the receiving device 2 to the transmitting device 1 or from the transmitting device 1 to the receiving device 2.

Figure 8:
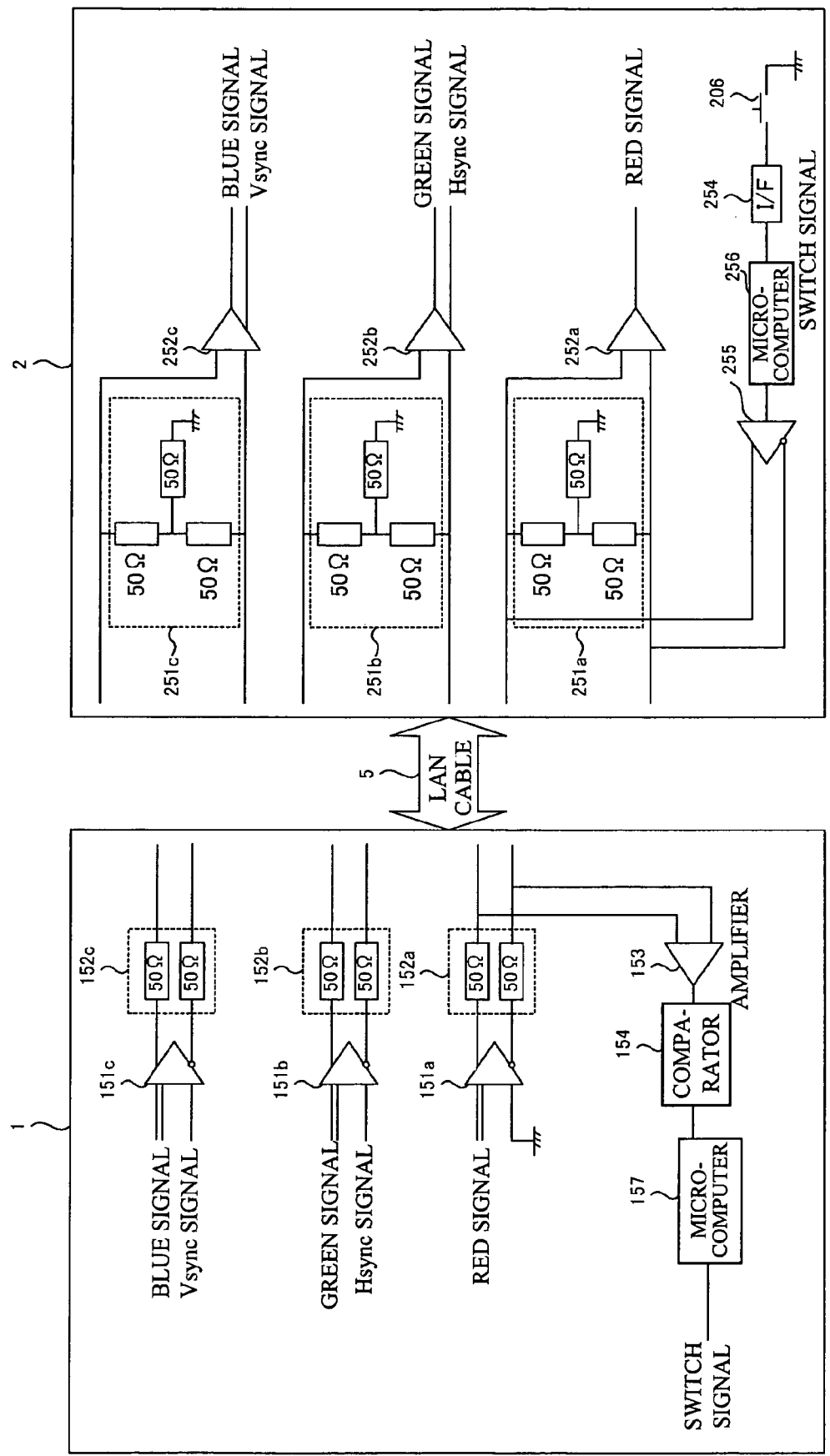
FIG. 8 is a schematic diagram showing a third variation of the circuits of the transmitting device 1 and the receiving device 2.
Figure 9:
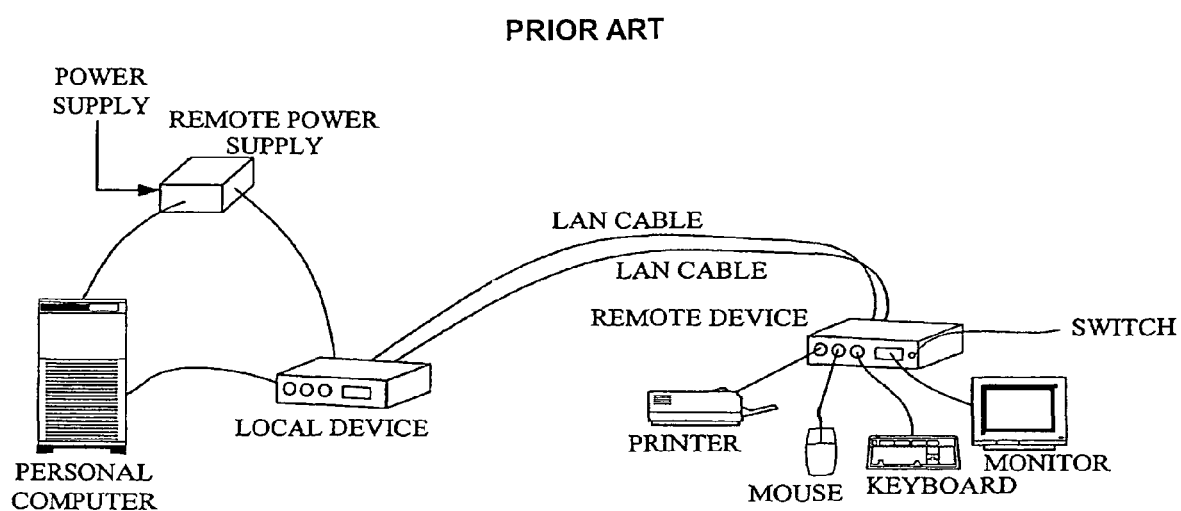
FIG. 9 is a diagram showing the configuration of a conventional power supply controlling system.

FIG. 8 is a schematic diagram showing a third variation of the circuits of the transmitting device 1 and the receiving device 2.

FIG. 8 is different from FIG. 7 in that the vertical synchronizing signal is not input to the microcomputers 256 and 157. Other elements in FIG. 8 are the same as those in FIG. 7.

Although in the second variation, the microcomputer 256 inputs the switch signal from the I/F circuit 254, and outputs the pattern signal generated with the microcomputer 256 itself to the transmitter 255 in synchronization with the timing of the vertical synchronizing signal, in the third variation, the microcomputer 256 outputs the pattern signal generated with the microcomputer 256 itself to the transmitter 255 without synchronizing with the timing of the vertical synchronizing signal. That is, the microcomputer 256 outputs the pattern signal to the transmitter 255 without regard to the timing of the vertical synchronizing signal if the transmitting device 1 and the receiving device 2 are turned on.

In this case, when the red signal is output from the transmitting device 1 to the receiving device 2, the red color on the screen of the monitor 9 is disordered. However, when the display of monitor 9 is disordered at the moment of turning off the power supply of the PC 4, the problem in the use of the power supply controlling system does not occur.

In this case, a voltage value of the pattern signal is made higher than a normal voltage value, and the microcomputer 157 of the transmitting device 1 changes a threshold of the voltage for extracting or distinguishing the pattern signal from the mixed signals. For example, if the voltage value of the pattern signal output from the transmitting device 1 to the receiving device 2 is 2.5 volts in the second variation, in the third variation, the microcomputer 256 sets the voltage value of the pattern signal to 3 volts, and the microcomputer 157 sets the threshold of the voltage for extracting or distinguishing the pattern signal from the mixed signals to 2.7 volts. Accordingly, the pattern signal can be extracted certainly, and the power supply controlling system can be prevented from malfunctioning.

According to the power supply controlling system in FIG. 8, the receiving device 2 includes the switch 206, and the microcomputer 256 and the transmitter 255 that transmit the pattern signal used for ON/OFF of the power supply device 3 without synchronizing with the vertical synchronizing signal to the transmitting device 1 via the signal lines of numbers 1 and 2 used for the reception of the red signal which are different from the signal lines of numbers 7 and 8 used for the reception of the blue signal. The transmitting device 1 includes the microcomputer 157 that acquires the pattern signal from the signal lines of numbers 1 and 2 on which the red signal and the switch signal are mixed, based on the threshold of the voltage for extracting or distinguishing the pattern signal, and outputs the pattern signal to the power supply device 3. The receiving device 2 and the transmitting device 1 are connected to each other with the single LAN cable 5 including the signal lines of numbers 1, 2, 7, and 8.

Therefore, it is possible to control ON/OFF of the power supply device provided on the remote place via the single LAN cable. Further, two LAN cables needed conventionally are enough in one of them, so that wiring work of the cable can be simplified and cost performance can be improved.

It should be noted that the present invention is not limited to those exemplary embodiments, and various modifications may be made to them without departing from the scope of the invention.

The Present application is based on Japanese Patent Application No. 2007-291361 filed Nov. 8, 2007, the entire disclosure of which is hereby incorporated by reference.

What is claimed is:

1. A power supply controlling system comprising a receiving device, a power supply device that supplies electric power to an information processing apparatus outputting first and second video signals, and a transmitting device connected to the information processing apparatus,
the receiving device including:
a power supply switch; and
a transmitting portion that transmits a switch signal of the power supply switch used for on/off of the power supply device to the transmitting device via second signal lines used for the reception of the second video signal, which are different from first signal lines used for the reception of the first video signal,
the transmitting device including:
an acquiring portion that acquires the switch signal of the power supply switch from the second signal lines on which the second video signal and the switch signal of the power supply switch are mixed; and
an outputting portion that outputs the switch signal of the power supply switch to the power supply device,
wherein the receiving device and the transmitting device are connected to each other with a single cable including the first signal lines and the second signal lines.

2. The power supply controlling system as claimed in claim 1, wherein each of the first video signal and the second video signal includes at least one blank period for transmitting a video synchronizing signal from the transmitting device to the receiving device, and
the transmitting portion transmits the switch signal of the power supply switch to the transmitting device via the second signal lines in synchronization with the video synchronizing signal superimposed on the first video signal.

3. The power supply controlling system as claimed in claim 2, wherein
the acquiring portion acquires the switch signal of the power supply switch from the second signal lines in timing synchronous with the video synchronizing signal.

4. The power supply controlling system as claimed in claim 1, wherein
the power supply device supplies the electric power to the information processing apparatus or cancels supplying the electric power to the information processing apparatus, according to the switch signal from the transmitting device.

5. The power supply controlling system as claimed in claim 2, wherein the power supply device supplies the electric power to the information processing apparatus or cancels supplying the electric power to the information processing apparatus, according to the switch signal from the transmitting device.

6. The power supply controlling system as claimed in claim 3, wherein the power supply device supplies the electric power to the information processing apparatus or cancels supplying the electric power to the information processing apparatus, according to the switch signal from the transmitting device.

7. The power supply controlling system as claimed in claim 1, wherein the transmitting device includes a converting portion that the switch signal into a pattern signal composed of digital patterns, and
the acquiring portion acquires the pattern signal from the second signal lines on which the second video signal and the pattern signal are mixed.

8. The power supply controlling system as claimed in claim 2, wherein the transmitting device includes a converting portion that the switch signal into a pattern signal composed of digital patterns, and
the acquiring portion acquires the pattern signal from the second signal lines on which the second video signal and the pattern signal are mixed.

9. The power supply controlling system as claimed in claim 3, wherein the transmitting device includes a converting portion that the switch signal into a pattern signal composed of digital patterns, and the acquiring portion acquires the pattern signal from the second signal lines on which the second video signal and the pattern signal are mixed.

10. The power supply controlling system as claimed in claim 4, wherein the transmitting device includes a converting portion that the switch signal into a pattern signal composed of digital patterns, and the acquiring portion acquires the pattern signal from the second signal lines on which the second video signal and the pattern signal are mixed.

11. The power supply controlling system as claimed in claim 5, wherein the transmitting device includes a converting portion that the switch signal into a pattern signal composed of digital patterns, and the acquiring portion acquires the pattern signal from the second signal lines on which the second video signal and the pattern signal are mixed.

12. The power supply controlling system as claimed in claim 6, wherein the transmitting device includes a converting portion that the switch signal into a pattern signal composed of digital patterns, and the acquiring portion acquires the pattern signal from the second signal lines on which the second video signal and the pattern signal are mixed.

13. The power supply controlling system as claimed in claim 1, wherein the single cable includes at least eight signal lines.

* * * * *